United States Patent [19]
Kato

[11] 4,291,788
[45] Sep. 29, 1981

[54] CYLINDER HEAD

[75] Inventor: Tetuo Kato, Musashino, Japan

[73] Assignee: Tokico Ltd., Kawasaki, Japan

[21] Appl. No.: 120,646

[22] Filed: Feb. 11, 1980

Related U.S. Application Data
[63] Continuation of Ser. No. 896,150, Apr. 13, 1978.

[30] Foreign Application Priority Data
Apr. 19, 1977 [JP]  Japan ................................ 52-49184

[51] Int. Cl.³ .................. F15B 15/22; F16F 5/00; F16F 9/00
[52] U.S. Cl. .................. 188/322.17; 267/64.15; 92/86
[58] Field of Search .................. 92/86; 188/322; 267/64 A, 64 B, 113; 220/366

[56] References Cited
U.S. PATENT DOCUMENTS
| | | | |
|---|---|---|---|
| 1,747,968 | 2/1930 | Braren | 92/86 |
| 2,784,865 | 3/1957 | Rieke | 220/366 |
| 3,116,812 | 1/1964 | Farmer et al. | 92/86 |
| 3,584,331 | 6/1971 | D'Hooge | 92/86 |

*Primary Examiner*—Paul E. Maslousky
*Attorney, Agent, or Firm*—Wenderoth, Lind & Ponack

[57] ABSTRACT

A cylinder device such as a hydraulic shock absorber, a gas spring or the like having a main body having an open end, a closure member screw-threadedly engaging the open end, of the main body, a rod guide disposed inside of the closure member, a piston rod extending slidably through center bores formed respectively in the closure member and the rod guide, pressurized fluid enclosed in the cylinder device, and a seal member interposed between the rod guide and the closure member. An escape passage has one end thereof communicating with the outside of the device and the other end thereof communicating with the screw-threading engaging portion between the closure member and the main body.

4 Claims, 6 Drawing Figures

4,291,788

CYLINDER HEAD

This is a continuation of application Ser. No. 896,150, filed Apr. 13, 1978.

BACKGROUND OF THE INVENTION

This invention relates to cylinder devices enclosing pressurized fluid therein such as hydraulic shock absorbers, gas springs or the like.

It is known to provide a removable closure member on the cylinder device of the aforementioned type so as to make possible access to the interior of the cylinder device for maintenance or repair and to effect assembling or disassembling operation easily. However, in removing the closure member from the cylinder device the closure member has sometimes been blown-off the cylinder device by pressurized fluid in the device at the moment when engagement between the closure member and the cylinder device is released, which is very dangerous.

BRIEF SUMMARY OF THE INVENTION

An object of the present invention is to overcome the problems described above by providing a cylinder device having an escape passage one end of which opens to the outside of the cylinder device and the other end of which communicates with screw-threadly engaging portion between a closure member and a cylinder or a main body of the cylinder device, whereby pressurized fluid in the cylinder device is exhausted through the escape passage before the screw-threading engagement between the closure member and the cylinder is completely released.

BRIEF DESCRIPTION OF THE DRAWINGS

The present invention will now be further described with reference to the accompanying drawings; in which.

DETAILED DESCRIPTION OF PREFERRED EMBODIMENTS

Figure 1:
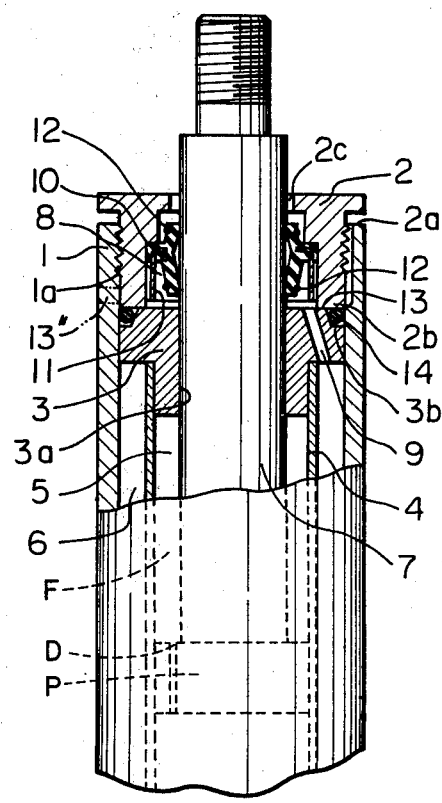
FIG. 1 is a partial longitudinal cross-sectional view showing a first embodiment of the present invention and also showing the feature of a third embodiment of the present invention.

A hydraulic shock absorber shown in FIG. 1 as a first embodiment of the cylinder device according to the present invention comprises a cylinder or a main body 1 with the lower end being closed as schematically shown in FIG. 1 and an upper open end. The structure other than that illustrated in detail at the upper end of the device is conventional and is included only for the purpose of defining a complete device. The open end of the cylinder 1 is closed by a closure member 2. In the inner periphery of the upper end portion of the cylinder 1, there is formed a female screw-thread portion 1a which is in screw-threaded engagement with screw-thread portion 2a formed on the outer periphery of the closure member 2. A rod guide 3 is disposed in the cylinder 1 and abuts the lower end of the closure member 2. The rod guide 3 has a large diameter portion engaging with the inner periphery of the cylinder 1 and a reduced diameter portion depending therefrom. An inner tube or a pressure cylinder 4 is fitted on the reduced diameter portion of the rod guide 3 and located coaxially with the cylinder 1. The inner tube 4 divides the interior of the cylinder 1 into an inner chamber 5 and an outer chamber 6.

The closure member 2 and the rod guide 3 have center bores 2c and 3a respectively which extend in the vertical direction in the drawing, and a piston rod 7 extends through bores 2c and 3a. A piston P is secured to the lower end of the piston rod 7 and slides in the chamber 5. A damping force generating device D is included in the piston. In the interior of the cylinder device, there is enclosed pressurized fluid F, usually hydraulic oil in the inner chamber 5 and oil and pressurized gas in the outer chamber 6.

A space 8 defined between the closure member 2 and the rod guide 3 communicates with the outer chamber 6 through a connecting hole 9 formed in the rod guide 3 and with the inner chamber 5 through a clearance between the center bore 3a and the piston rod 7. For preventing leakage of pressurized fluid out of the cylinder device, a seal member 10 having a metal core 11 secured thereto is disposed in the space 8 and engages sealingly with the piston rod 7 and with the closure member 2. The seal member 10 shown in the drawing has upper and lower lip portions which are urged against the piston rod 7 by spring rings 12.

The construction described as above is familiar to those skilled in the art as a dual tube hydraulic shock absorber and the details of the construction and function thereof will not be necessary.

Figure 2A:
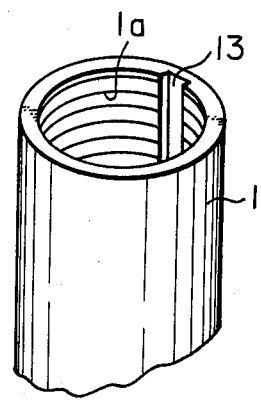
FIG. 2(a) is a perspective view showing an open end portion of a cylinder of FIG. 1.
Figure 2B:
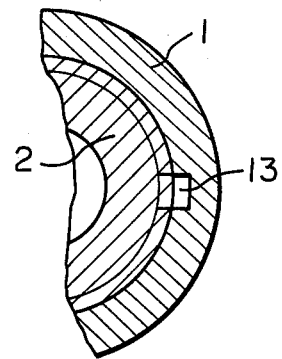
FIG. 2(b) is a partial transverse cross-sectional view showing a closure member and the cylinder of FIG. 1.

According to the present invention there is provided an escape passage 13 formed in the inner wall of the cylinder 1 at the juncture of the screw-thread portion 1a of the cylinder 1 with the closure member 2. The passage 13 is formed as an axial groove in the cylinder 1 as shown in FIGS. 2(a) and 2(b), and the upper end opens to the outside of the cylinder device and the lower end terminates in screw-thread portion 1a. The lower end of the passage 13 is spaced from the upper end of the rod guide 3 a short distance. The depth of the axial groove 13 is greater than that of the root of screw-threads of the screw-thread portion 1a. A suitable seal member 14 such as an O-ring or the like is mounted on an annular cut-out portion 3b formed in the upper and outer peripheral surface of the rod guide 3 for engaging tightly against the inner periphery of the cylinder 1 and against the lower end portion 2b of the closure member 2 when the closure member 2 is mounted on the cylinder 1 in the normal assembled condition. Thus, the seal member 14 ensures fluid-tightness between the rod guide 3 and the lower end 2b of the closure member 2 and also between the inner periphery of the cylinder 1 and the rod guide 3.

With the construction as described heretofore, when the closure member 2 is, during disassembling of the closure member 2 from the cylinder device, rotated and moved upward relative to the cylinder 1 to an extent such that the closure member 2 separates from the O-ring 14, whereby fluid-tightness between the closure member 2 and the rod guide 3 is broken, further upward movement of the closure member 2 will cause the space 8 to communicate with the escape passage 13. Then, pressurized fluid in the cylinder device escapes quickly from the cylinder while the closure member 2 is still engaged with the cylinder 1 sufficiently so that the closure member 2 will not be blown off the cylinder 1 due to pressure of the pressurized fluid. After exhausting pressurized fluid sufficiently, the closure member 2 is rotated further relative to the cylinder 1 and is removed therefrom. Thus, it is possible to prevent blown off of the closure member which has occurred in prior art devices at or just before the moment when screw-threaded engagement between the closure member and the cylinder is released completely. In disassembling the closure member 2 the rod guide 3 is retained in its position since the pressure of pressurized fluid acts equally on the upper and the lower surfaces of the rod guide 3 and fictional resistance acts against the movement of the rod guide 3 relative to the cylinder 1 and the piston rod 7.

Figure 3A:
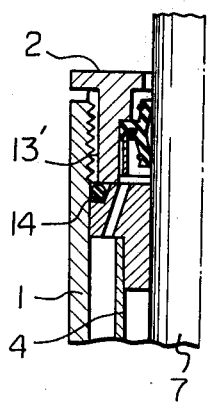
FIG. 3(a) is a partial longitudinal cross-sectional view of a second embodiment of the present invention.
Figure 3B:
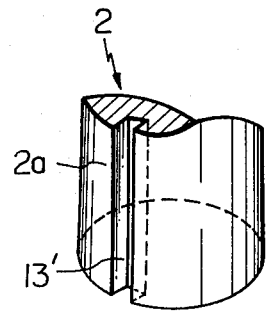
FIG. 3(b) is a perspective view showing a portion of a closure member of the second embodiment.
Figure 3C:
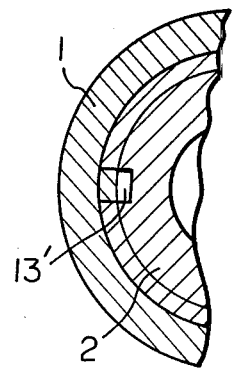
FIG. 3(c) is a partial transverse cross-sectional view similar to FIG. 2(b).

FIGS. 3(a), 3(b) and 3(c) show a second embodiment of the present invention. In the first embodiment the escape passage 13 is formed as an axial groove in the cylinder 1, while, in the second embodiment, an escape passage 13' is formed as an axial groove in the outer periphery of the closure member 2. The escape passage 13' extends to the lower end portion 2b of the closure member 2. It will be understood that screw-threads are formed on the outer peripheral portion 2a of the closure member 2 although they are not shown in FIG. 3(b). The operation of the second embodiment is similar to that of the first embodiment, but the amount of upward movement of the closure member 2 required to open the escape passage is smaller than that of the first embodiment, so that the pressurized fluid in the cylinder device can be exhausted more safely.

A third embodiment of the present invention will be explained referring FIG. 1 again. In the embodiment, an escape passage 13'' is formed by an opening extending radially through the peripheral wall of the cylinder 1 at a position slightly above the O-ring 14 as shown in chain lines in the drawing.

Although the embodiments described heretofore relate to dual tube type hydraulic shock absorbers, the present invention may also be applied to single tube type hydraulic shock absorbers, gas springs or the like.

As described heretofore, pressurized fluid in the cylinder device according to the present invention can be exhausted automatically from the cylinder device through the escape passage when disassembling the closure member from the cylinder, by loosening the screw-threadedly engaging closure member by a relatively small amount such that the closure member is retained reliably on the cylinder by screw-threaded engagement. Thus, it is possible to prevent in a reliable way blow off of the closure member from the cylinder, which has sometimes happened with prior art cylinder devices at or just before the moment when screw-threaded engagement between the closure member and the cylinder is released completely and, therefore, the disassembling operation can be performed safely.

Further, since the closure member is in removably screw-threaded engagement with the cylinder, the closure member can be retained reliably on the main body of the cylinder device even though the closure member is moved a substantial amount in the direction of disassembly, and the closure member can be maintained in such condition until the pressurized fluid in the cylinder device is exhausted sufficiently from the device.

It will be noted that the seal member 14 shown in the embodiments is disposed in the upper and radially outer edges of the rod guide 3, as shown in FIGS. 1 and 3(a). Thus, a single seal member can act to seal a clearance defined between the closure member and the rod guide and also a clearance defined between the inner periphery of the cylinder 1 and the outer periphery of the rod guide 3.

What is claimed is:

1. A dual tube type device such as a hydraulic shock absorber or the like, said device comprising; an outer tube having a closed lower end and an open end; an inner tube coaxial with the outer tube and having an open upper end and further having a piston slidable therein with damping force generating means therein and a piston rod on said piston extending out of the open ends of said tubes; a rod guide closing the upper end of the inner tube and having said piston rod extending therethrough in sliding engagement therewith; a closure member threadedly engaged with the upper end of the outer tube and through which the piston rod extends in sliding sealing engagement therewith and, in the fully threadedly engaged position, engaging said rod guide for holding it in said inner tube; pressurized fluid contained in the device; and an escape passage means for releasing the pressurized fluid during removal of said closure member from the device, said means including an escape passage one end of which is permanently open to the outside of said device and seal means provided between said closure member and the remainder of said device adjacent the other end of said escape passage and engaged by the inner end of said closure member for sealing the escape passage means from a space within the device when said closure member is fully threadedly engaged with said outer tube in a normally fully assembled position and said escape passage being open to the space within the device only when said closure member has been displaced in a direction outward toward the open end of the outer tube during removal of said closure member from said device.

2. A cylinder device as claimed in claim 1 wherein the open end of said outer tube has a female screw-threaded portion therein and said closure member has a male screw-threaded portion thereon engaging with said female threads, and one of said threaded portions has a groove therein constituting said escape passage means, said groove having the outer end opening out of the end of said portion at the outer end of said cylinder and having the inner end at the inner end of said closure member, and said seal means being a seal between the inner end of said closure member and said outer tube and sealingly engaged by said closure member when said closure member is fully threaded into said cylinder.

3. A cylinder device as claimed in claim 2 in which said groove is in the male screw threads on the outer periphery of said closure member.

4. A cylinder device as claimed in claim 1 further comprising means adjacent the outer end of said escape passage means for deflecting the pressurized fluid flowing out of the cylinder device through said escape passage means generally in a radially outward direction with respect to said cylinder.

* * * * *